Jan. 17, 1939.  E. C. BRISBANE  2,144,305
VALVE OPERATING MECHANISM
Filed Aug. 6, 1937  4 Sheets—Sheet 4

VALVE CLOSED
PLUG SEATED

VALVE CLOSED
PLUG UNSEATED

VALVE OPEN
PLUG UNSEATED

VALVE OPEN
PLUG SEATED

Inventor
EUGENE C. BRISBANE
By Malcolm F. Gannett
Attorney

Patented Jan. 17, 1939

2,144,305

UNITED STATES PATENT OFFICE 2,144,305

VALVE OPERATING MECHANISM

Eugene C. Brisbane, Denver, Colo., assignor to S. Morgan Smith Company, York, Pa., a corporation of Pennsylvania Application August 6, 1937, Serial No. 157,643

2 Claims. (Cl. 74—20)

This invention relates to valves, and more particularly to taper plug valves having power operated mechanism for operating the valve plug.

An object of the invention is to provide an improved actuating mechanism for a valve of the type adapted to be raised, turned and reseated.

Another object of the invention is to provide an improved valve structure which includes a rotatable plug having a shaft with a slotted rotor mounted thereon a collar keyed to the plug shaft to rotate therewith, and means operatively associated with the rotor and with the collar for operating the same in such a manner that the valve plug is first moved axially to unwedge the same, then rotated to its open or closed position, and then moved axially to rewedge the same.

With the foregoing and other objects and advantages in view, the invention consists in the preferred construction and arrangement of the several parts which will be hereinafter more fully described and claimed.

Figs. 4 to 7 inclusive and Figs. 8 to 11 inclusive are schematic views in corresponding pairs to show successive stages in the operation of the valve from closed to open position.

Figure 1:
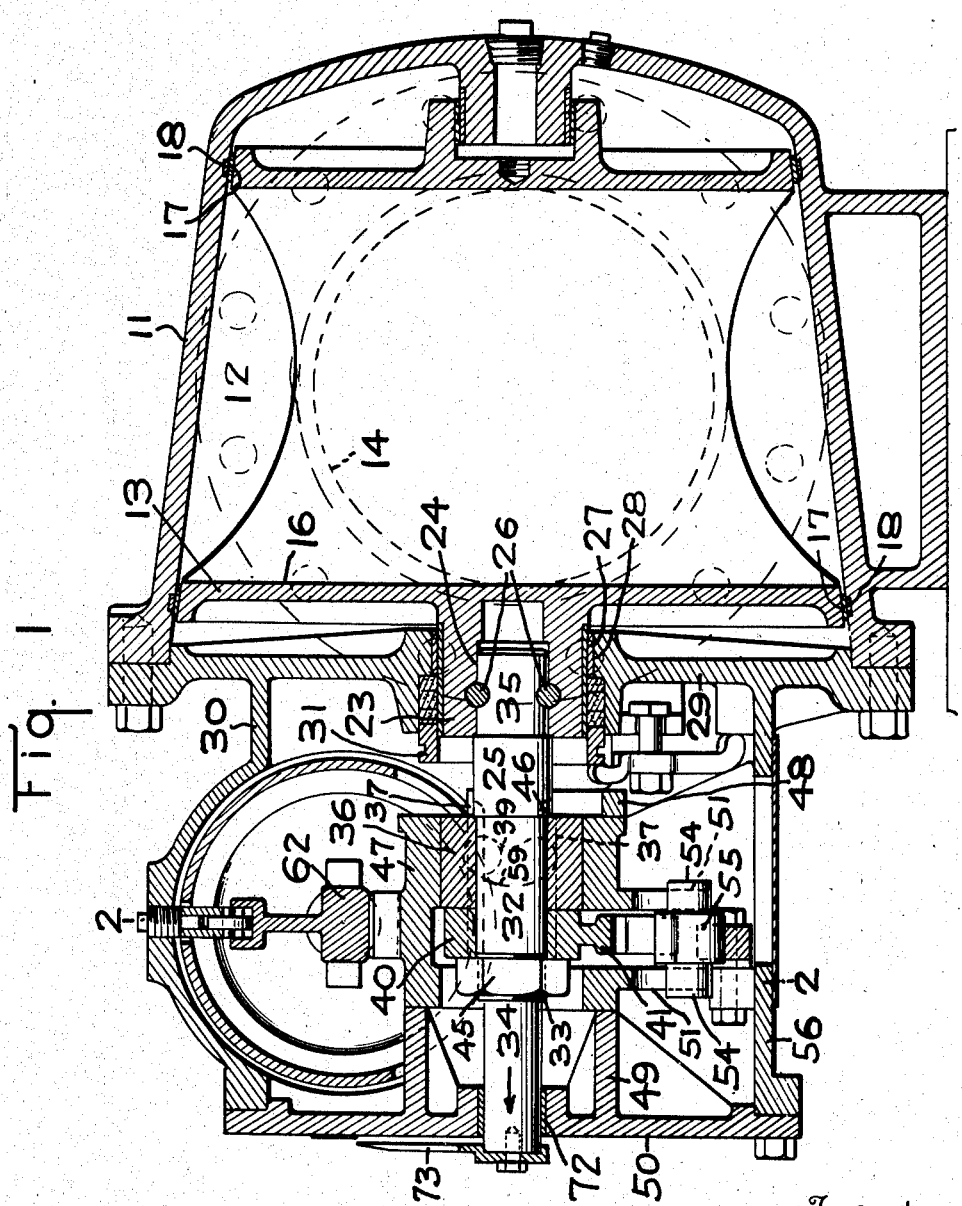
Figure 1 is a vertical longitudinal section through a valve constructed in accordance with the present invention, showing the same in closed position.

Referring to the drawings, the improved valve comprises a main body or casing 11 having a cavity 12 formed therein for a tapered plug 13, the cavity being intersected by a longitudinal waterway or opening 14, indicated by dotted lines in Fig. 1, which opening constitutes a passage through the valve. The plug 13 has a passage 16 formed therein of substantially the same diameter as the valve passage 14, so that when the plug is in open position, a uniform bore will extend through the valve from end to end.

The valve plug 13 may be equipped with seat rings 17 which are adapted to engage seat rings 18 mounted in the body 11 so as to provide a tight joint between the valve body and the plug when the plug is in its seated or wedged position.

The tapered plug 13 is supported for both axial and rotary movement in the valve body 11.

At its inner or smaller end, the plug 13 is formed with an extension which constitutes a trunnion 20 having an opening 21 formed therein for the reception of a stem or spindle 22, projecting inwardly from the smaller end of the valve body 11.

At its outer or larger end, the plug 13 is formed with a cylindrical boss 23 having a bore 24 formed therein for the reception of one end of a valve shaft 25, keyed to the plug 13 by means of a pair of pins 26 which are inserted in alined grooves formed, respectively, in the boss 23 and the valve shaft 25, as shown in Fig. 1.

The boss 23 is journalled in a bushing 27 mounted in an opening 28 formed centrally in a web 29 of a housing 30 attached to the valve body 11, said bushing constituting a bearing for the valve plug and its shaft, and said web constituting a cover plate for the larger end of the valve body. The housing 30 constitutes a closure for the valve operating mechanism.

A packing gland 31, fastened to the outer side of the web 29, prevents leakage of fluid around the boss 23.

In the present instance, the valve shaft 25 is shown as being formed with a plurality of sections which successively decrease in diameter from the boss 23 of the plug outwardly. The larger section of the valve shaft is indicated by the reference numeral 25. The other sections 32, 33 and 34 are constructed of less diameters than the portion 25. The shaft 25 also has a reduced section 35 mounted within the boss 23.

Figure 2:
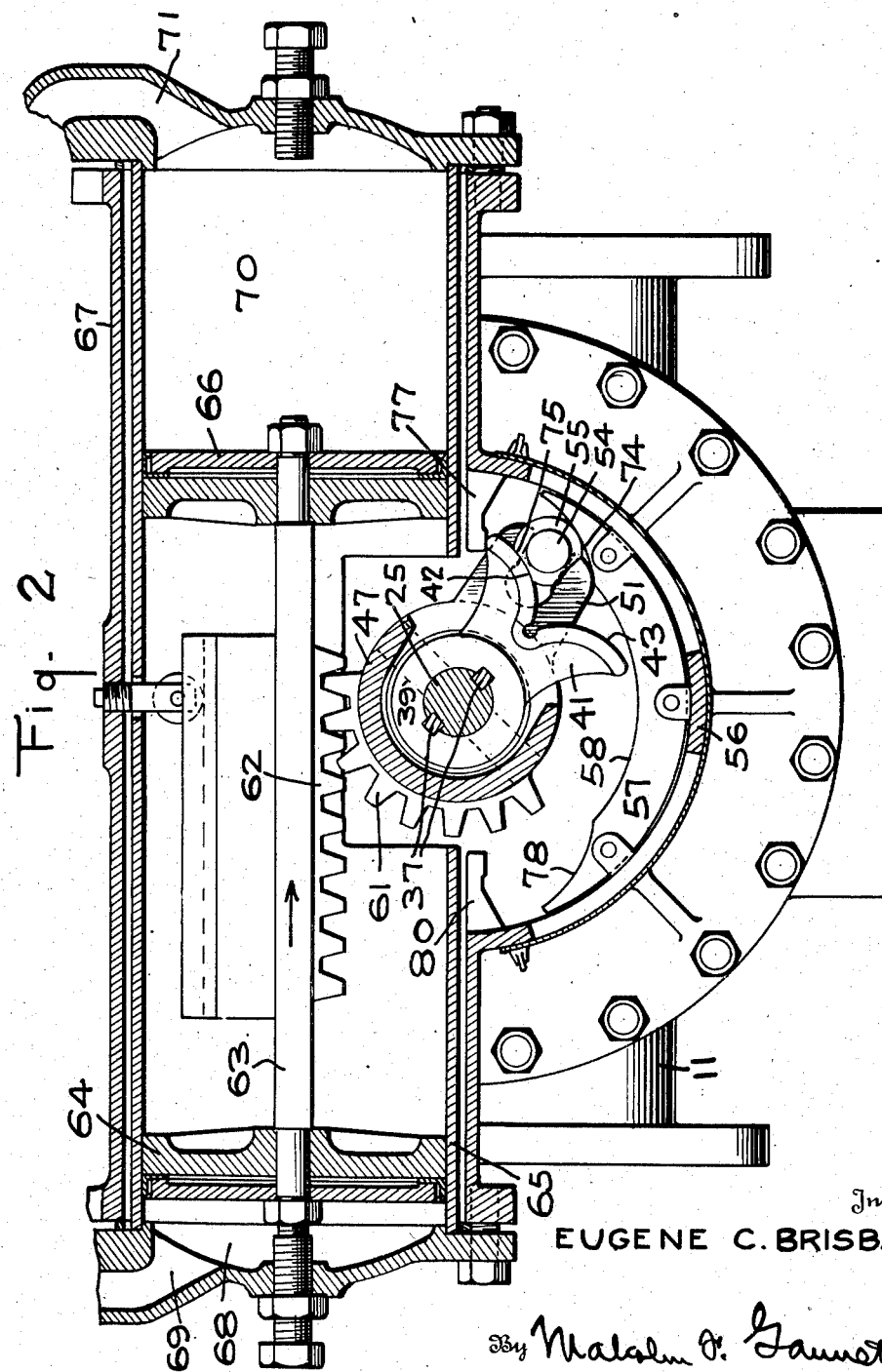
Fig. 2 is a vertical section taken on the line 2—2 of Fig. 1.

Mounted on the portion 32 of the valve shaft is a thrust collar 36, said collar being keyed to the valve shaft by keys 37 (see Figs. 1 and 2).

Figure 3:
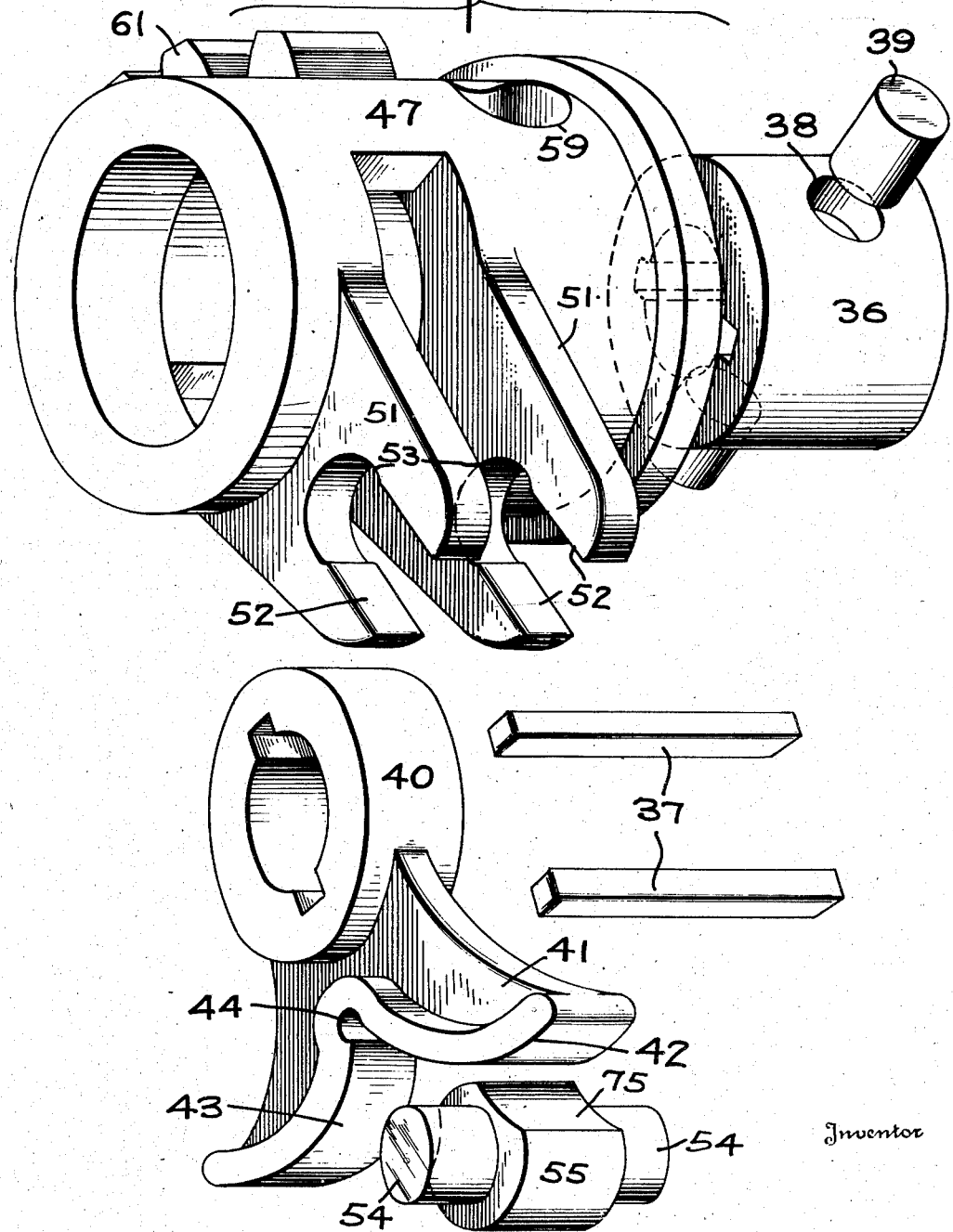
Fig. 3 is an exploded perspective of the elements associated with the valve shaft for operating the same.

The thrust collar 36 is formed with a pair of diametrically disposed openings 38, in which openings are mounted lifter pins 39 (see Fig. 3).

Also mounted on the portion 32 of the valve shaft is a second collar 40, which is keyed to said shaft by the keys 37.

The collar 40 has a member 41 projecting laterally therefrom and constituting a rotator lever, the outer periphery of which is formed with a crotch of somewhat V-shape having curved sides 42 and 43 and an apex 44.

The portion 33 of the valve shaft is threaded for the reception of a nut 45 which is screwed down tightly so that the collars 36 and 40 will be clamped tightly between the inner face of the nut and a shoulder 46 formed on the shaft between the portions 25 and 32 thereof (see Fig. 1).

Rotatably mounted on the collar 36 is a sleeve 47, constituting a rotor. The sleeve is quite long and has its inner end bearing against a web 48 formed as a part of the housing 30 and surrounding the valve shaft 25, and its outer end bearing against a tubular boss 49 formed on a cover 50, said boss surrounding the portion 34 of the valve shaft.

The sleeve 47 has formed therein diametrically disposed V-shaped slots 59, in which are disposed the extending portions of the pins 39 carried by the collar 36. The disposition of the slots 59 is such that when the valve plug 13 is in closed and seated position in the casing 11, the pins 39 are disposed in one end portion of the slots, when the valve plug is unseated, the pins 39 will be disposed in the intermediate or apex portion of said slots, and when the valve plug is again reseated in open position, the pins 39 will be disposed in the other end of said slots 59.

The sleeve 47 is formed with a lever having a pair of arms 51, said arms straddling the rotator lever 41 heretofore referred to.

The arms 51 are formed with slots 52 having parallel side walls, the inner ends of said slots being arcuate in form, as indicated at 53 (Fig. 3).

The slots 52 of the lever 51 receive the two reduced ends 54 of an escapement pin 55.

The housing 30 is formed with a lower arcuate wall 56 which wall surrounds the lower portion of the valve operating mechanism. Carried by the wall 56 is an arcuately shaped member 57, having an upper cam surface 58 for guiding the escapement pin 55.

The portion of the sleeve 47 diametrically disposed with respect to the lever 51, is formed with teeth 61, said teeth being in the form of a sector, as shown in Fig. 2.

The sector teeth 61 of the sleeve 47 are in meshing relationship with the teeth of a rack bar 62, carried by a rod 63.

One end of the rod 63 is connected to a piston 64 in a cylinder 65, and the other end of the rod 63 is connected to a piston 66 in a cylinder 67. The pistons and their respective cylinders are opposed, as shown in Fig. 2.

Chamber 68 on the outer end of the cylinder 65 has a port 69, and chamber 70 on the outer end of cylinder 67 has a port 71. The ports 69 and 71 may be connected to suitable mechanism (not shown) controlling fluid under pressure for alternately operating pistons 64 and 66, so that the rack 62 will be reciprocated, and thereby operate the gear sector 61.

The portion 34 of the valve shaft is journalled in a bushing 72 carried by the cover 50, the extremity of the valve shaft projecting through said cover and having fixed thereto an indicator arm 73 adapted to indicate the position of the valve plug.

Figure 4:
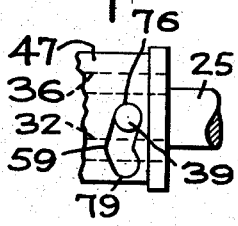
Figure 8:
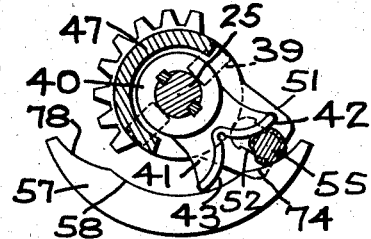

As shown in Figs. 2, 4 and 8, when the valve plug is in closed and seated position, the pin 55 will be disposed on the cam surface 74 of the pin guide member 57, the reduced end portions 54 of the pin being disposed near the outer ends of the slots 52 of the levers 51, and the arcuate portion 75 of the pin 55 being in contact with the curved surface 42 of the lever 41. Also, the pins 39 will be disposed in the ends 76 of the slots 59 in the sleeve 47. In this position of the valve plug, the tip of the curved surface 42 of the lever 41 engages a stop 77.

When it is desired to turn the plug 13 from closed to open position, the control valve mechanism (not shown) is operated to connect piston chamber 70 to a sewer or other suitable free discharge, and fluid under pressure is supplied to piston chamber 68. Pistons 64 and 66 and rack bar 62 will then be moved toward the right in the direction of the arrow, Fig. 2. This movement of the rack bar 62 from left to right, effects rotation of the sleeve 47 in a clockwise direction, with the result that the pin 55 is moved along the cam surface 74, said pin traveling inwardly of the slots 52 in the lever 51 and also traveling to the apex 44 of the crotch in the lever 41.

During this initial movement of the plug operating mechanism, the collar 40 is locked against rotation, being prevented from turning by the engagement of the arcuate surface 75 of the pin 55 with the surface 42 of the lever 41.

During the initial movement of the sleeve 47, the pins 39 are moved away from the ends 76 of the slots 59, and due to the shape of said slots, the pins 39 will be drawn or moved in a direction axially of the valve shaft, as indicated by the arrow, Fig. 1, and in so moving, said pins will effect an axial or longitudinal movement of the valve shaft 25 and the plug 13, thereby unseating said plug.

Figure 5:
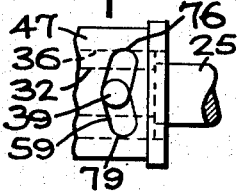
Figure 9:
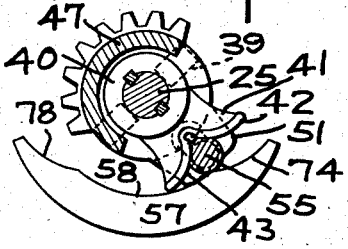

When the parts are in the position shown in Figs. 5 and 9 with the pin 55 in the apex 44 of the crotch of lever 41, the lever 51 will be locked to the lever 41 so as to carry the same in its subsequent rotation.

Figure 6:
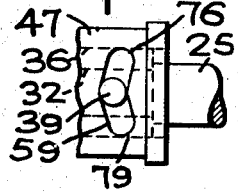
Figure 10:
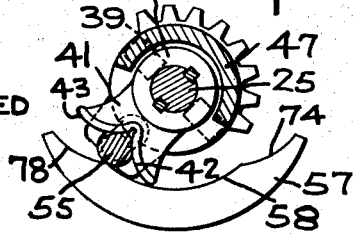

Figs. 6 and 10 show the position of the parts at the end of the next period of rotation of the sleeve 47. During this angle of rotation the collars 36 and 40, the sleeve 47, valve plug shaft 25, and valve plug 13 move together and the parts remain in the same relative position. At the end of this period of rotation, the valve is open but the plug 13 is still lifted from its seat.

At the left end of the cam surface 58, the pin guide member 57 is formed with a cam surface 78 having such a contour as to effect an outward or downward movement of the pin 55 away from the apex of the notch 44 in the lever 41.

Figure 7:
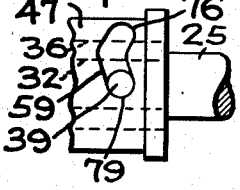
Figure 11:
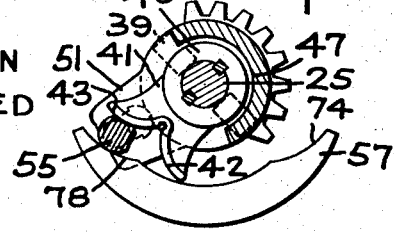

Figs. 7 and 11 show the position of the parts at the end of the final rotation of the sleeve 47. During the final period of rotation of the sleeve 47, the plug 13 is locked from rotation since the pin travels to the outer ends of the slots 52, guided by the surface 78 of the pin guide member 57 and the curved surface 43 of the lever 41. In this final period of rotation of the parts during which the plug shaft 25 does not turn, the lifting pins 39 are carried to the ends 79 of the V-shaped slots 59 in the sleeve 47 whereby said plug shaft is forced down for seating the plug 13. At the end of said operation the tip of the curved surface 43 of lever 41 engages stop 80 and the valve is open and the plug seated.

The reverse of the above described operation takes place in closing the valve.

Having thus described my invention, what I claim is:

1. Actuating means for a shaft adapted to be moved in a straight line a predetermined distance and then rotated at the completion of the reciprocating movement through a predetermined arc, comprising a collar fixed to said shaft and having a pair of pins projecting laterally therefrom, a sleeve having a smooth internal bore loosely mounted on said collar, said sleeve having a forked lever projecting laterally therefrom and V-shaped slots formed in the sleeve for said pins, a rotator lever keyed to the shaft and having a V-shaped peripheral crotch formed with arcuate side walls, an escapement pin operatively associated with said forked lever and said rotator lever, means for rotating said sleeve and its forked lever, and a stationary pin guide member having cam surfaces for guiding said pin along the peripheral crotch of said rotator lever whereby in extreme angular positions of said sleeve the rotator lever will be uncoupled from the sleeve and in the intermediate position of rotation of said sleeve said rotator lever will be interlocked with the sleeve.

2. Actuating means for a shaft adapted to be moved in a straight line a predetermined distance and then rotated at the completion of the reciprocating movement through a predetermined arc, comprising a collar fixed to said shaft and having a pair of pins projecting laterally therefrom, a sleeve rotatably mounted on said collar, said sleeve having V-shaped slots for said pins and a forked lever projecting laterally therefrom, a rotator lever keyed to said shaft and having a peripheral V-shaped crotch, an escapement pin operatively associated with said forked lever and said rotator lever, means for rotating said sleeve and its forked lever, and a stationary pin guide member having cam surfaces for directing said escapement pin into and out of said crotch during rotary movement of said sleeve whereby said rotator lever will be interlocked with said sleeve during the intermediate portion of the rotary movement of the sleeve and said collar pins will be moved in the V-shaped slots of said sleeve to effect rectilinear movement of the shaft in a straight line during the initial portion and final portion of the rotary movement of said sleeve in one direction.

EUGENE C. BRISBANE.